United States Patent
Jamali et al.

(10) Patent No.: US 11,657,320 B2
(45) Date of Patent: May 23, 2023

(54) USING ONLINE ENGAGEMENT FOOTPRINTS FOR VIDEO ENGAGEMENT PREDICTION

(71) Applicant: Microsoft Technology Licensing, LLC, Redmond, WA (US)

(72) Inventors: Seyedmohsen Jamali, Sunnyvale, CA (US); Samaneh Abbasi Moghaddam, Sunnyvale, CA (US); Ali Abbasi, Mountain View, CA (US); Revant Kumar, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1105 days.

(21) Appl. No.: 16/286,465

(22) Filed: Feb. 26, 2019

(65) Prior Publication Data

US 2020/0272937 A1 Aug. 27, 2020

(51) Int. Cl.
| | |
|---|---|
| *G06N 20/00* | (2019.01) |
| *G06F 16/74* | (2019.01) |
| *G06N 5/02* | (2023.01) |
| *G06F 16/78* | (2019.01) |
| *G06F 16/735* | (2019.01) |
| *H04N 21/81* | (2011.01) |

(Continued)

(52) U.S. Cl.
CPC ........... *G06N 20/00* (2019.01); *G06F 16/735* (2019.01); *G06F 16/74* (2019.01); *G06F 16/7867* (2019.01); *G06N 5/02* (2013.01); *G06Q 30/0255* (2013.01); *H04N 21/251* (2013.01); *H04N 21/812* (2013.01)

(58) Field of Classification Search
CPC .......... G06N 20/00; G06N 5/02; G06F 16/74; G06F 16/7867; G06F 16/735; G06Q 30/0255; H04N 21/251; H04N 21/812
See application file for complete search history.

(56) References Cited

U.S. PATENT DOCUMENTS

| | | | |
|---|---|---|---|
| 10,110,545 B1 * | 10/2018 | Freay | H04L 51/046 |
| 10,607,086 B1 | 3/2020 | Grady et al. | |
| 11,238,367 B1 * | 2/2022 | Liu | H04L 67/10 |

(Continued)

OTHER PUBLICATIONS

"Notice of Allowance issued in U.S. Appl. No. 16/745,147", dated Apr. 15, 2021, 17 Pages.

*Primary Examiner* — Annan Q Shang
*Assistant Examiner* — Alexander Boyd
(74) *Attorney, Agent, or Firm* — NDWE, LLP

(57) ABSTRACT

Techniques for using online engagement footprints for video engagement prediction are provided. In one technique, events are received from multiple client devices, each event indicating a type of engagement of a video item from among multiple types of engagement. One or more machine learning techniques are used to train a prediction model that is based on the events and multiple features that includes the multiple types of engagement. In response to receiving a content request, multiple entity feature values are identified for a particular entity that is associated with the content request. Two or more of the entity feature values correspond to two or more of the types of engagement. A prediction is generated based on the entity feature values and the prediction model. The prediction is used to determine whether to select, from candidate content items, a particular content item that includes particular video.

20 Claims, 4 Drawing Sheets

(51) Int. Cl.
*G06Q 30/0251* (2023.01)
*H04N 21/25* (2011.01)

(56) References Cited

U.S. PATENT DOCUMENTS

| | | |
|---|---|---|
| 2014/0337096 A1* | 11/2014 | Bilenko ................. G06N 20/00 |
| | | 705/7.31 |
| 2016/0034786 A1 | 2/2016 | Suri et al. |
| 2016/0314410 A1 | 10/2016 | Carmichael et al. |
| 2017/0061286 A1* | 3/2017 | Kumar ............... G06Q 30/0269 |
| 2017/0161773 A1* | 6/2017 | Xu ..................... G06Q 30/0243 |
| 2017/0251258 A1* | 8/2017 | Swaminathan .... H04N 21/4532 |
| 2017/0295374 A1 | 10/2017 | Aaron et al. |
| 2018/0084310 A1 | 3/2018 | Katz et al. |
| 2018/0167619 A1 | 6/2018 | Li et al. |
| 2019/0220525 A1 | 7/2019 | Song et al. |
| 2020/0219145 A1* | 7/2020 | Kalampoukas .... G06Q 30/0275 |
| 2021/0027065 A1 | 1/2021 | Chung et al. |
| 2021/0099715 A1 | 4/2021 | Topiwala et al. |
| 2021/0227298 A1 | 7/2021 | Talkhoonche et al. |

\* cited by examiner

USING ONLINE ENGAGEMENT FOOTPRINTS FOR VIDEO ENGAGEMENT PREDICTION

TECHNICAL FIELD

The present disclosure relates to online video items and, more particularly, to leveraging online video engagement to train machine-learned models for video engagement prediction.

BACKGROUND

The Internet has enabled the delivery of electronic content to billions of people. Sophisticated techniques have been explored and implemented to identify content that is relevant to viewers that are requesting other content. Such techniques may involve hundreds and thousands of computations that occur for a single request. If processing a content request takes results in identifying irrelevant content, then poor user experience results and content providers will choose other content exchanges to delivery their respective content. Thus, processing of content requests from remote computing devices by taking into account relevant information and efficient transmission of any results of the content requests is critical.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method are provided for predicting video engagement using online engagement footprints. In one technique, multiple different types of engagements of video items are logged and used to generate training data. An engagement ratio is calculated for each type of engagement and with respect to each applicable entity involved in the engagement. One or more machine learning techniques are used to generate a prediction model based on the training data. In response to receiving a content request associated with a particular entity, one or more engagement ratios associated with the particular entity are identified and used to generate one or more predictions, each prediction indicating a likelihood of whether a particular action will be performed relative to a candidate video item.

Embodiments have improved computer technology in multiple ways. First, results of embodiments have shown that taking into account one or more of these types of video engagements in training the prediction model has significantly improved the accuracy of the prediction model over past prediction models that do not take into account these types of video engagements. Therefore, more relevant video items are delivered over computer networks to client devices. In other words, electronic content delivery technology is improved. Second, the amount of resources that content providers of video items must commit to the content delivery system in order to have their video items transmitted over a computer network has reduced; thus, freeing up resources for pursuing other content delivery campaigns. Thus, electronic content delivery technology is improved through increases in efficiency.

System Overview

Figure 1:
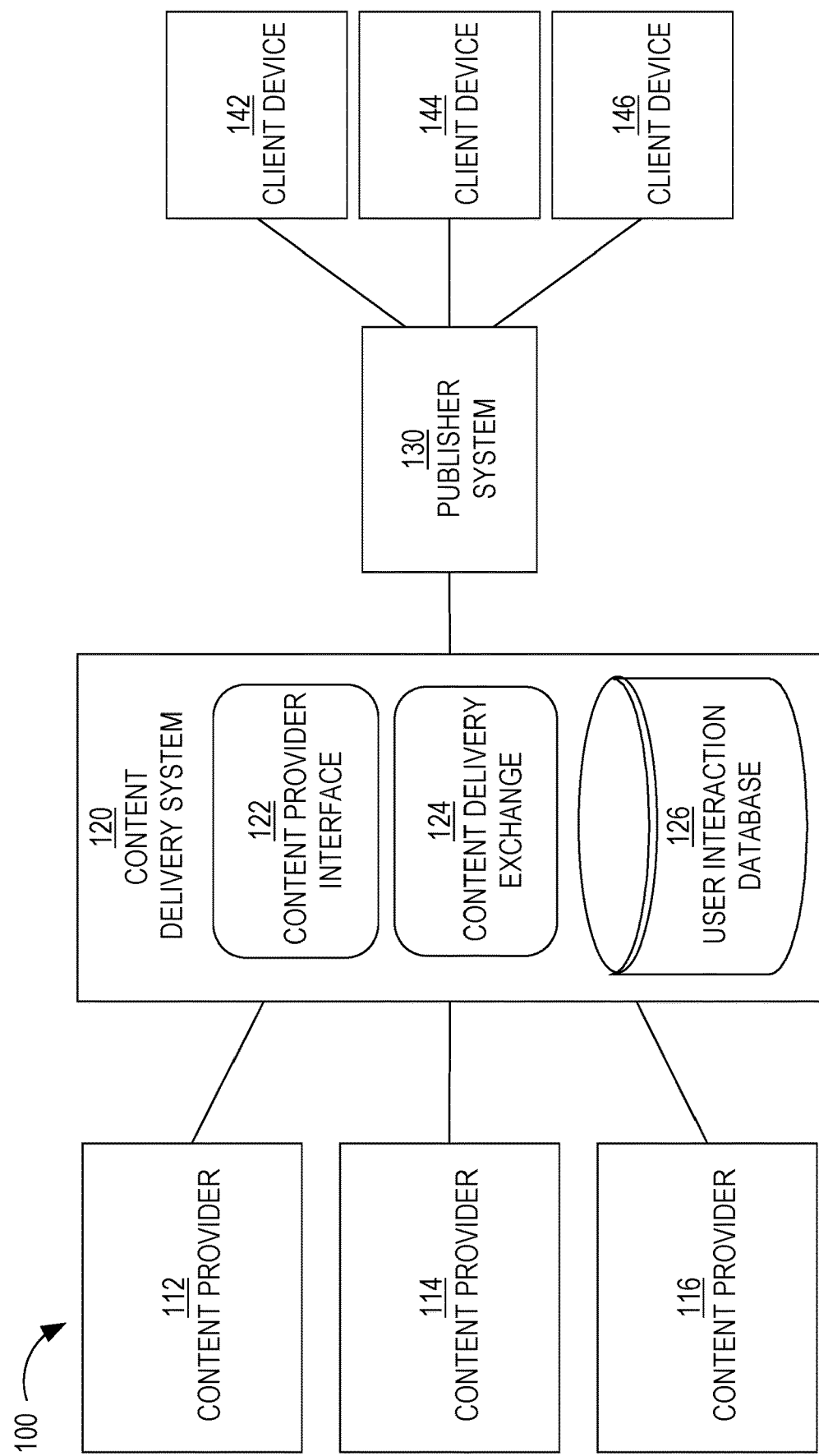
FIG. 1 is a block diagram that depicts an example system for distributing content items to one or more end-users, in an embodiment.

FIG. 1 is a block diagram that depicts a system 100 for distributing content items to one or more end-users, in an embodiment. System 100 includes content providers 112-116, a content delivery system 120, a publisher system 130, and client devices 142-146. Although three content providers are depicted, system 100 may include more or less content providers. Similarly, system 100 may include more than one publisher and more or less client devices.

Content providers 112-116 interact with content delivery system 120 (e.g., over a network, such as a LAN, WAN, or the Internet) to enable content items to be presented, through publisher system 130, to end-users operating client devices 142-146. Thus, content providers 112-116 provide content items to content delivery system 120, which in turn selects content items to provide to publisher system 130 for presentation to users of client devices 142-146. However, at the time that content provider 112 registers with content delivery system 120, neither party may know which end-users or client devices will receive content items from content provider 112.

An example of a content provider includes an advertiser. An advertiser of a product or service may be the same party as the party that makes or provides the product or service. Alternatively, an advertiser may contract with a producer or service provider to market or advertise a product or service provided by the producer/service provider. Another example of a content provider is an online ad network that contracts with multiple advertisers to provide content items (e.g., advertisements) to end users, either through publishers directly or indirectly through content delivery system 120.

Although depicted in a single element, content delivery system 120 may comprise multiple computing elements and devices, connected in a local network or distributed regionally or globally across many networks, such as the Internet. Thus, content delivery system 120 may comprise multiple computing elements, including file servers and database systems. For example, content delivery system 120 includes (1) a content provider interface 122 that allows content providers 112-116 to create and manage their respective content delivery campaigns and (2) a content delivery exchange 124 that conducts content item selection events in response to content requests from a third-party content delivery exchange and/or from publisher systems, such as publisher system 130.

Publisher system 130 provides its own content to client devices 142-146 in response to requests initiated by users of client devices 142-146. The content may be about any topic, such as news, sports, finance, and traveling. Publishers may vary greatly in size and influence, such as Fortune 500 companies, social network providers, and individual bloggers. A content request from a client device may be in the form of a HTTP request that includes a Uniform Resource Locator (URL) and may be issued from a web browser or a software application that is configured to only communicate with publisher system 130 (and/or its affiliates). A content request may be a request that is immediately preceded by user input (e.g., selecting a hyperlink on web page) or may be initiated as part of a subscription, such as through a Rich Site Summary (RSS) feed. In response to a request for content from a client device, publisher system 130 provides the requested content (e.g., a web page) to the client device.

Simultaneously or immediately before or after the requested content is sent to a client device, a content request is sent to content delivery system 120 (or, more specifically, to content delivery exchange 124). That request is sent (over a network, such as a LAN, WAN, or the Internet) by publisher system 130 or by the client device that requested the original content from publisher system 130. For example, a web page that the client device renders includes one or more calls (or HTTP requests) to content delivery exchange 124 for one or more content items. In response, content delivery exchange 124 provides (over a network, such as a LAN, WAN, or the Internet) one or more particular content items to the client device directly or through publisher system 130. In this way, the one or more particular content items may be presented (e.g., displayed) concurrently with the content requested by the client device from publisher system 130.

In response to receiving a content request, content delivery exchange 124 initiates a content item selection event that involves selecting one or more content items (from among multiple content items) to present to the client device that initiated the content request. An example of a content item selection event is an auction.

Content delivery system 120 and publisher system 130 may be owned and operated by the same entity or party. Alternatively, content delivery system 120 and publisher system 130 are owned and operated by different entities or parties.

A content item may comprise an image, a video, audio, text, graphics, virtual reality, or any combination thereof. A content item may also include a link (or URL) such that, when a user selects (e.g., with a finger on a touchscreen or with a cursor of a mouse device) the content item, a (e.g., HTTP) request is sent over a network (e.g., the Internet) to a destination indicated by the link. In response, content of a web page corresponding to the link may be displayed on the user's client device.

Examples of client devices 142-146 include desktop computers, laptop computers, tablet computers, wearable devices, video game consoles, and smartphones.

Bidders

In a related embodiment, system 100 also includes one or more bidders (not depicted). A bidder is a party that is different than a content provider, that interacts with content delivery exchange 124, and that bids for space (on one or more publisher systems, such as publisher system 130) to present content items on behalf of multiple content providers. Thus, a bidder is another source of content items that content delivery exchange 124 may select for presentation through publisher system 130. Thus, a bidder acts as a content provider to content delivery exchange 124 or publisher system 130. Examples of bidders include AppNexus, DoubleClick, and LinkedIn. Because bidders act on behalf of content providers (e.g., advertisers), bidders create content delivery campaigns and, thus, specify user targeting criteria and, optionally, frequency cap rules, similar to a traditional content provider.

In a related embodiment, system 100 includes one or more bidders but no content providers. However, embodiments described herein are applicable to any of the above-described system arrangements.

Content Delivery Campaigns

Each content provider establishes a content delivery campaign with content delivery system 120 through, for example, content provider interface 122. An example of content provider interface 122 is Campaign Manager™ provided by LinkedIn. Content provider interface 122 comprises a set of user interfaces that allow a representative of a content provider to create an account for the content provider, create one or more content delivery campaigns within the account, and establish one or more attributes of each content delivery campaign. Examples of campaign attributes are described in detail below.

A content delivery campaign includes (or is associated with) one or more content items. Thus, the same content item may be presented to users of client devices 142-146. Alternatively, a content delivery campaign may be designed such that the same user is (or different users are) presented different content items from the same campaign. For example, the content items of a content delivery campaign may have a specific order, such that one content item is not presented to a user before another content item is presented to that user.

A content delivery campaign is an organized way to present information to users that qualify for the campaign. Different content providers have different purposes in establishing a content delivery campaign. Example purposes include having users view a particular video or web page, fill out a form with personal information, purchase a product or service, make a donation to a charitable organization, volunteer time at an organization, or become aware of an enterprise or initiative, whether commercial, charitable, or political.

A content delivery campaign has a start date/time and, optionally, a defined end date/time. For example, a content delivery campaign may be to present a set of content items from Jun. 1, 2015 to Aug. 1, 2015, regardless of the number of times the set of content items are presented ("impressions"), the number of user selections of the content items (e.g., click throughs), or the number of conversions that resulted from the content delivery campaign. Thus, in this example, there is a definite (or "hard") end date. As another example, a content delivery campaign may have a "soft" end date, where the content delivery campaign ends when the corresponding set of content items are displayed a certain number of times, when a certain number of users view, select, or click on the set of content items, when a certain number of users purchase a product/service associated with the content delivery campaign or fill out a particular form on a website, or when a budget of the content delivery campaign has been exhausted.

A content delivery campaign may specify one or more targeting criteria that are used to determine whether to present a content item of the content delivery campaign to one or more users. (In most content delivery systems, targeting criteria cannot be so granular as to target individual members.) Example factors include date of presentation, time of day of presentation, characteristics of a user to which the content item will be presented, attributes of a computing device that will present the content item, identity of the publisher, etc. Examples of characteristics of a user include demographic information, geographic information (e.g., of an employer), job title, employment status, academic degrees earned, academic institutions attended, former employers, current employer, number of connections in a social network, number and type of skills, number of endorsements, and stated interests. Examples of attributes of a computing device include type of device (e.g., smartphone, tablet, desktop, laptop), geographical location, operating system type and version, size of screen, etc.

For example, targeting criteria of a particular content delivery campaign may indicate that a content item is to be presented to users with at least one undergraduate degree, who are unemployed, who are accessing from South America, and where the request for content items is initiated by a smartphone of the user. If content delivery exchange 124 receives, from a computing device, a request that does not satisfy the targeting criteria, then content delivery exchange 124 ensures that any content items associated with the particular content delivery campaign are not sent to the computing device.

Thus, content delivery exchange 124 is responsible for selecting a content delivery campaign in response to a request from a remote computing device by comparing (1) targeting data associated with the computing device and/or a user of the computing device with (2) targeting criteria of one or more content delivery campaigns. Multiple content delivery campaigns may be identified in response to the request as being relevant to the user of the computing device. Content delivery exchange 124 may select a strict subset of the identified content delivery campaigns from which content items will be identified and presented to the user of the computing device.

Instead of one set of targeting criteria, a single content delivery campaign may be associated with multiple sets of targeting criteria. For example, one set of targeting criteria may be used during one period of time of the content delivery campaign and another set of targeting criteria may be used during another period of time of the campaign. As another example, a content delivery campaign may be associated with multiple content items, one of which may be associated with one set of targeting criteria and another one of which is associated with a different set of targeting criteria. Thus, while one content request from publisher system 130 may not satisfy targeting criteria of one content item of a campaign, the same content request may satisfy targeting criteria of another content item of the campaign.

Different content delivery campaigns that content delivery system 120 manages may have different charge models. For example, content delivery system 120 (or, rather, the entity that operates content delivery system 120) may charge a content provider of one content delivery campaign for each presentation of a content item from the content delivery campaign (referred to herein as cost per impression or CPM). Content delivery system 120 may charge a content provider of another content delivery campaign for each time a user interacts with a content item from the content delivery campaign, such as selecting or clicking on the content item (referred to herein as cost per click or CPC). Content delivery system 120 may charge a content provider of another content delivery campaign for each time a user performs a particular action, such as purchasing a product or service, downloading a software application, or filling out a form (referred to herein as cost per action or CPA). Content delivery system 120 may manage only campaigns that are of the same type of charging model or may manage campaigns that are of any combination of the three types of charging models.

A content delivery campaign may be associated with a resource budget that indicates how much the corresponding content provider is willing to be charged by content delivery system 120, such as $100 or $5,200. A content delivery campaign may also be associated with a bid amount that indicates how much the corresponding content provider is willing to be charged for each impression, click, or other action. For example, a CPM campaign may bid five cents for an impression, a CPC campaign may bid five dollars for a click, and a CPA campaign may bid five hundred dollars for a conversion (e.g., a purchase of a product or service).

Content Item Selection Events

As mentioned previously, a content item selection event is when multiple content items (e.g., from different content delivery campaigns) are considered and a subset selected for presentation on a computing device in response to a request. Thus, each content request that content delivery exchange 124 receives triggers a content item selection event.

For example, in response to receiving a content request, content delivery exchange 124 analyzes multiple content delivery campaigns to determine whether attributes associated with the content request (e.g., attributes of a user that initiated the content request, attributes of a computing device operated by the user, current date/time) satisfy targeting criteria associated with each of the analyzed content delivery campaigns. If so, the content delivery campaign is considered a candidate content delivery campaign. One or more filtering criteria may be applied to a set of candidate content delivery campaigns to reduce the total number of candidates.

As another example, users are assigned to content delivery campaigns (or specific content items within campaigns) "off-line"; that is, before content delivery exchange 124 receives a content request that is initiated by the user. For example, when a content delivery campaign is created based on input from a content provider, one or more computing components may compare the targeting criteria of the content delivery campaign with attributes of many users to determine which users are to be targeted by the content delivery campaign. If a user's attributes satisfy the targeting criteria of the content delivery campaign, then the user is assigned to a target audience of the content delivery campaign. Thus, an association between the user and the content delivery campaign is made. Later, when a content request that is initiated by the user is received, all the content delivery campaigns that are associated with the user may be quickly identified, in order to avoid real-time (or on-the-fly) processing of the targeting criteria. Some of the identified campaigns may be further filtered based on, for example, the campaign being deactivated or terminated, the device that the user is operating being of a different type (e.g., desktop) than the type of device targeted by the campaign (e.g., mobile device).

A final set of candidate content delivery campaigns is ranked based on one or more criteria, such as predicted click-through rate (which may be relevant only for CPC campaigns), effective cost per impression (which may be relevant to CPC, CPM, and CPA campaigns), and/or bid price. Each content delivery campaign may be associated with a bid price that represents how much the corresponding content provider is willing to pay (e.g., content delivery system 120) for having a content item of the campaign presented to an end-user or selected by an end-user. Different content delivery campaigns may have different bid prices. Generally, content delivery campaigns associated with relatively higher bid prices will be selected for displaying their respective content items relative to content items of content delivery campaigns associated with relatively lower bid prices. Other factors may limit the effect of bid prices, such as objective measures of quality of the content items (e.g., actual click-through rate (CTR) and/or predicted CTR of each content item), budget pacing (which controls how fast a campaign's budget is used and, thus, may limit a content item from being displayed at certain times), frequency capping (which limits how often a content item is presented to the same person), and a domain of a URL that a content item might include.

An example of a content item selection event is an advertisement auction, or simply an "ad auction."

In one embodiment, content delivery exchange 124 conducts one or more content item selection events. Thus, content delivery exchange 124 has access to all data associated with making a decision of which content item(s) to select, including bid price of each campaign in the final set of content delivery campaigns, an identity of an end-user to which the selected content item(s) will be presented, an indication of whether a content item from each campaign was presented to the end-user, a predicted CTR of each campaign, a CPC or CPM of each campaign.

In another embodiment, an exchange that is owned and operated by an entity that is different than the entity that operates content delivery system 120 conducts one or more content item selection events. In this latter embodiment, content delivery system 120 sends one or more content items to the other exchange, which selects one or more content items from among multiple content items that the other exchange receives from multiple sources. In this embodiment, content delivery exchange 124 does not necessarily know (a) which content item was selected if the selected content item was from a different source than content delivery system 120 or (b) the bid prices of each content item that was part of the content item selection event. Thus, the other exchange may provide, to content delivery system 120, information regarding one or more bid prices and, optionally, other information associated with the content item(s) that was/were selected during a content item selection event, information such as the minimum winning bid or the highest bid of the content item that was not selected during the content item selection event.

Event Logging

Content delivery system 120 may log one or more types of events, with respect to content item, across client devices 142-146 (and other client devices not depicted). For example, content delivery system 120 determines whether a content item that content delivery exchange 124 delivers is presented at (e.g., displayed by or played back at) a client device. Such an "event" is referred to as an "impression." As another example, content delivery system 120 determines whether a content item that exchange 124 delivers is selected by a user of a client device. Such a "user interaction" is referred to as a "click." Content delivery system 120 stores such data as user interaction data, such as an impression data set and/or a click data set. Thus, content delivery system 120 may include a user interaction database 128. Logging such events allows content delivery system 120 to track how well different content items and/or campaigns perform.

For example, content delivery system 120 receives impression data items, each of which is associated with a different instance of an impression and a particular content item. An impression data item may indicate a particular content item, a date of the impression, a time of the impression, a particular publisher or source (e.g., onsite v. offsite), a particular client device that displayed the specific content item (e.g., through a client device identifier), and/or a user identifier of a user that operates the particular client device. Thus, if content delivery system 120 manages delivery of multiple content items, then different impression data items may be associated with different content items. One or more of these individual data items may be encrypted to protect privacy of the end-user.

Similarly, a click data item may indicate a particular content item, a date of the user selection, a time of the user selection, a particular publisher or source (e.g., onsite v. offsite), a particular client device that displayed the specific content item, and/or a user identifier of a user that operates the particular client device. If impression data items are generated and processed properly, a click data item should be associated with an impression data item that corresponds to the click data item. From click data items and impression data items associated with a content item, content delivery system 120 may calculate a CTR for the content item.

Video Items

In an embodiment, a content item includes a video. Such content items are referred to herein as "video items." A video item may include text, graphics, one or more images, or any combination thereof. A displayed video item may include video controls, such as begin, pause, mute, unmute, rewind, forward, full screen, expand, collapse, skip, and replay.

A content item selection event may include one or more candidate video items and one or more non-video content items. Such a content item selection event is considered a "mixed" content item selection event or mixed auction. Different types of content items are ranked by bid, a likelihood of selection or viewing, or a combination of the two, referred to herein as ECPI, or effective cost per impression, which is calculated for each content item by multiplying the content item's bid by a likelihood that a particular user will select or view the content item. A content item from a CPM campaign will not have any such prediction; thus, an ECPI for a content item from a CPM campaign is the campaign's bid.

In an embodiment, a prediction of viewing a video of a video item (or simply "viewing a video item") depends on how much of the video is viewed or presented to the user. For example, a video may need to be presented to a user for two seconds before considering the video viewed by the user. Other periods of time (e.g., three seconds or ten seconds) may be followed.

The presentation of a video may begin automatically. For example, if three quarters of the video item is displayed (or three quarters of the video playing area is displayed), then the video automatically begins playing. Alternatively, presentation of a video may occur only in response to user input, such as the user selecting a play button control, the user tapping (with his/her finger on a touchscreen display) the video item or an image that is displayed over the video item, or the user hovering a mouse over the video item.

Logging Video Engagement

In an embodiment, engagement with videos are logged. Video engagement is detected based on events generated when a video is presented on a client device. A client application (whether a native application or a web application) generates an event when a video begins playing, when a user (or entity) interacts with the video by, for example, selecting a video control button (e.g., corresponding to unmute, play, or expand), and/or when a certain amount of video is presented (e.g., the first two seconds, a quarter of the video, half of the video, three quarters of the video, and/or the entire video). Each generated video-related event includes data similar to a click data item, such as a member identifier, a client identifier, content item identifier, a timestamp (indicating a date and/or time of day), channel type (e.g., mobile or desktop), location (e.g., feed, messaging, right rail), page identifier (indicating a particular web page or application view/tab on which the video item was presented, for example, if not in the user's feed), and a type of interaction (e.g., play, pause, unmute, collapse). A video-related event also includes an amount of video presented, such as two seconds, a quarter of the video, half of the video, etc. Thus, a single client application may generate multiple video-related events regarding a particular video, such as one event indicating that the particular video began to play, another indicating that two seconds of the particular video were presented, another event indicating that half of the particular video was presented, another event indicating that the user selected an unmute button, another event indicating that the user selected the expand button so that the particular video covered the entire screen of the user's device, and another event indicating that the entire video was presented on the user's device.

The client application transmits any generated video-related events over a computer network to content delivery system 120. Content delivery system 120 (or a component thereof) processes the video-related events to generate training data and/or generate input feature values for different users.

Engagement Footprint Features

In an embodiment, one or more machine learning techniques are used to train a prediction model for predicting whether a user (or entity) will perform an action relative to a video item. Examples actions include viewing the video item (e.g., where the video is automatically played), selecting the video item (e.g., to cause the video to be played), or selecting a particular video control button (e.g., a button to cause the video to be displayed full screen).

Training data comprises multiple training instances. Each training instance is based on a log of one or more video-related events. A video-related event may be one where a user performed the action in question or one where the user did not perform the action in question. For example, if (1) the action is viewing a video item for two seconds, (2) a video-related event indicates that an impression occurred relative to a particular user and a particular video item, and (3) there is no related event that indicates that the particular user viewed the particular video item (even for two seconds) as a result of the impression, then a training instance is created that indicates that the particular user did not perform the action relative to the particular video item. Thus, multiple video-related events are analyzed to generate such a "negative" training instance. As another example, if (1) the action is viewing a video item for two seconds and (2) a video-related event indicates that a particular user viewed a particular video item for two seconds, then a training instance is created that indicates that the particular user performed the action relative to the particular video item. Thus, only a single video-related event is analyzed in order to generate such a "positive" training instance.

Each training instance includes one or more engagement footprint features of the user corresponding to a video-related event pertaining to a particular video item. An engagement footprint feature for a user may be calculated by analyzing user interaction data pertaining to the user for the past particular period of time (e.g., fourteen days). The time from which to start may be a time when the corresponding event occurred. For example, if the period of time (T) is two weeks and a video-related event occurred yesterday at time t, then one or more engagement footprint feature values are calculated for the user based on user interaction data indicating a time between t and (t−T).

Specifically, an engagement footprint feature for each user m at time t may be defined as follows:

$$e_{m,t}^g = \frac{\sum_{s \in [t-T, t]} eng_{m,s}^g}{\sum_{s \in [t-T, t]} imp_{m,s}}$$

In the above, $e_{m,t}^g$ is the engagement ratio (used as an engagement footprint feature) being computed for user m and action or engagement type g (e.g., viewing two seconds, viewing the first-quartile of the video, selecting a particular video control button) at time t. T is the number of days considered in order to compute the engagement footprint feature value (e.g., fourteen days). Also, $imp_{m,s}$ is the number of impressions user m was impressed with in the time period of s, which is defined as between time t and time t−T. Lastly, $e_{m,t}^g$ is the number of times user m performed the action (or had engagement) of type g during time period s.

In an embodiment, each user is associated with multiple engagement footprint features or ratios, one for each action or engagement type. For example, one engagement footprint feature is created for viewing the first two seconds of a video, another engagement footprint feature is created for viewing the first quartile of a video, and another engagement footprint feature is created for viewing the entirety of a video. Other examples include more, less, or different sets of engagement footprint features. Thus, if a user is presented five video items and views the entirety of each video item, and there are 5 engagement types, then 25 (=5*5) engagement footprint events may be generated.

Each training instance also includes a label that indicates whether the user performed the action in question (e.g., watching at least two seconds of the corresponding video or unmuted the volume of the corresponding video), as indicated by one or more video-related events. A label value may be a 0 (indicating that the corresponding user did not perform the action) or 1 (indicating that the corresponding user performed the action).

A training instance may also include numerous other features, such as user features, video item features, and user-video item features. Examples of user features include a job title of the user, industry in which the user works, current employer of the user, skills listed by the user in a user profile, number of connections of the user in an online social network, academic degrees earned by the user, academic institutions attended by the user, current residence (provided by the user), and a user selection rate of the user (e.g., number of content items the user has selected in the past divided by the number of content items that have been presented to the user).

Examples of video item features include identity of the corresponding content provider, performance of the corresponding content delivery campaign (e.g., user selection rate, number of clicks), performance of the specific video item (if the campaign includes multiple content items), length of the video, textual features of any text of the video item, and actual video or images from the video.

Examples of contextual features include time of day, day of week, type of user device, and operating system of the user device.

User-video item features are cross features such as user segment X video topic, etc.

Example machine learning techniques include linear regression, logistic regression, gradient boosting decision trees, Naïve Bayes, artificial neural network, support vector machines (SVMs). Embodiments are not limited to any particular machine learning technique.

After training a machine-learned model based on the training data (or a portion thereof), the machine-learned model may be validated based a portion of the training data that was not used to train the model. If the model is accurate enough (e.g., precision and recall measurements are relatively high), then the model may be used to make predictions of whether a user will perform the action in question (i.e., corresponding to the label in the training data). For each user that initiated a content request, a member identifier of the user is identified based on the content request and attributes of the user are identified. For each identified candidate content item (in a content item selection event), attributes of the candidate content item and the attributes of the user, including engagement footprint features of the user, are input to the machine-learned model. The engagement footprint feature values of the user may be calculated in response to receiving the content request (i.e., in real-time). Alternatively, the engagement footprint feature values are precalculated and are retrieved at runtime in order to avoid real-time calculation.

Bucketized Engagement Footprint Features

The above techniques for calculating engagement footprint feature values and using them in a machine-learned model yields positive results. However, for users (or entities) associated with very few impressions, engagement ratio data will have less accurate estimates of predicted action performance (e.g., viewing two seconds of a video item) compared to users with relatively many impressions. Such a dearth in number of impressions adds noise to the estimations.

In an embodiment, to address the situation where a user has relatively few impressions, multiple buckets for each of one or more engagement footprint features are created. A user will be associated with a single bucket and, thus, only the engagement ratios or engagement footprint features that are assigned to that bucket. Engagement feature values assigned to other buckets will be zero or have a null value.

In an embodiment, a bucket corresponds to particular impression count range. Different buckets correspond to different impression count ranges. For example, bucket A corresponds to a single impression, bucket B corresponds to two impressions, bucket C corresponds to three impressions, bucket D corresponds to four impressions, bucket E corresponds to five impressions, bucket F corresponds to six through ten impressions, bucket G corresponds to eleven through fifty impressions, and bucket H corresponds to greater than fifty impressions. Thus, bucket A is for users who only have one impression in the time window (t−T through t) while bucket G is for users who have between eleven and fifty impressions.

In this embodiment, an engagement ratio is defined for each bucket or impression count range. For example, viewing two seconds of a video may be an engagement footprint feature for each of the buckets or impression count ranges. As another example, viewing the entirety of a video may be an engagement footprint feature for multiple buckets or impression count ranges. Thus, if there are five engagement footprint features defined and eight buckets, then the machine-learned model may be trained based on (5*8=40) forty bucketed features. When training the model, each training instance and each input corresponding to a particular user will have one or more engagement footprint feature values pertaining to a particular bucket calculated for the particular user and null or zero values for engagement footprint features assigned to each other bucket with which the particular user is not associated.

EXAMPLE PROCESS

Figure 2:
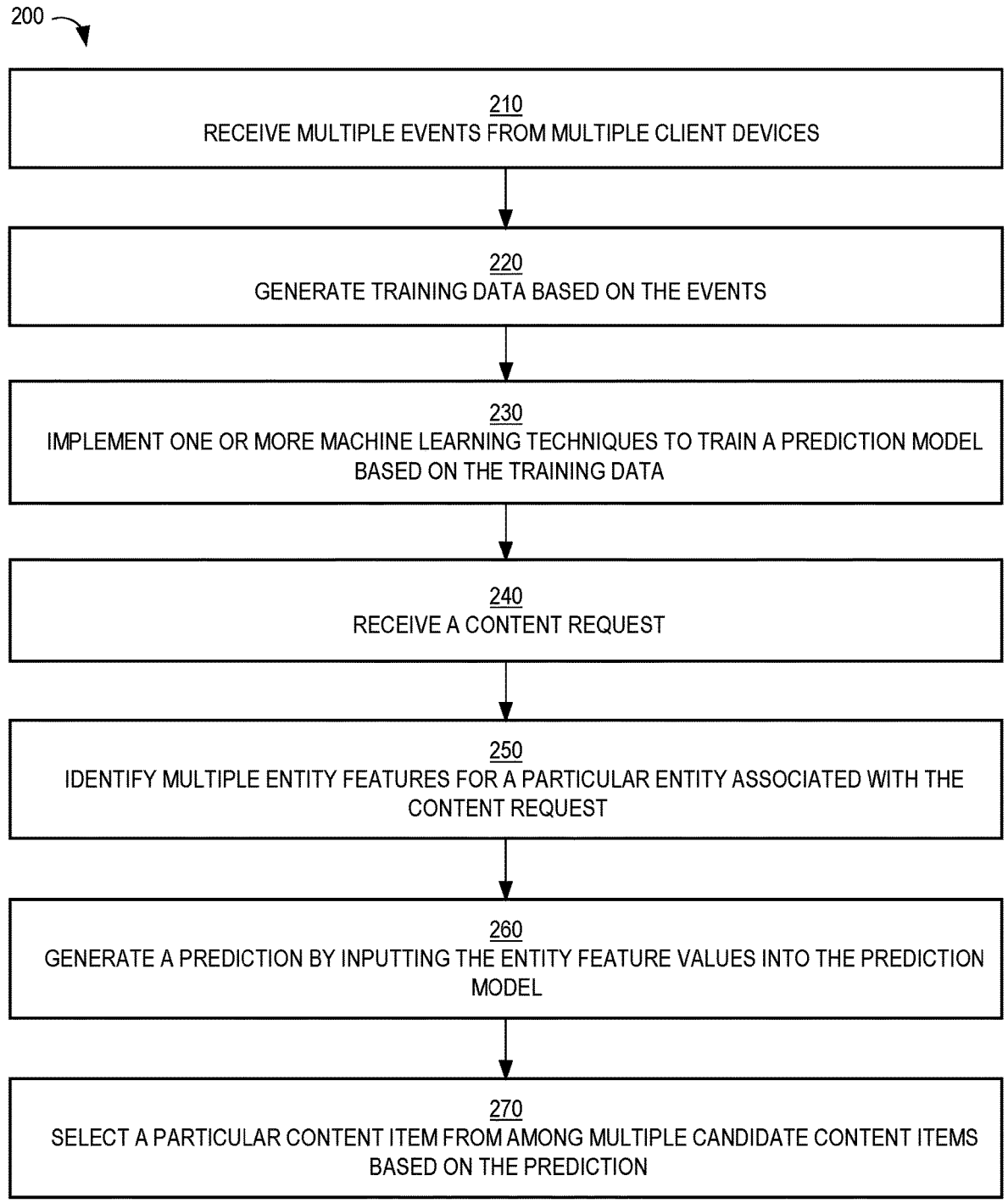
FIG. 2 is a flow diagram that depicts an example process for leveraging engagement footprint features in predicting actions relative to video items, in an embodiment.

FIG. 2 is a flow diagram that depicts an example process 200 for leveraging engagement footprint features in predicting actions relative to video items, in an embodiment. Process 200 may be performed by content delivery system 120.

At block 210, multiple events are received from multiple client devices (e.g., one or more of client devices 142-146) over a computer network (e.g., the Internet). Each event is generated by a client application executing on one of the client devices. Each event may include a client device identifier (e.g., IP address), a browser cookie, a mobile advertising identifier (MAID), and/or an entity identifier, such as a member identifier or an encrypted version thereof. Some of the events indicate that an impression of a video item occurred. Others of the events indicate a type of engagement of a video item. For example, a first event indicates a first type engagement (e.g., the first two seconds of the video being presented) and a second event indicates a second type of engagement (e.g., the first half of the video being presented) that is different than the first type of engagement. Thus, the client application detects how much a video is presented on a screen of the corresponding client device and generates an event indicating that a certain (e.g., threshold) amount has been presented.

At block 220, training data is generated based on the events. Each training instance corresponds to a single entity and indicates whether a particular action was performed (which may be different than one or more of the different types of engagement) relative to a particular video item. Each training instance also includes an engagement ratio for each of the multiple types of engagement along with other entity-specific features of the entity corresponding to the training instance. Each training instance may also include video-specific features. Thus, block 220 involves calculating the appropriate engagement ratios.

At block 230, one or more machine learning techniques are implemented to train a prediction model based on the training data and based on multiple features that includes the multiple types of engagements. The features are reflected in the training data.

At block 240, a content request is received. The content request is initiated by a client device (e.g., client device 144) that interacts with a publisher system (e.g., publisher system 130), causing a content request to be transmitted to content delivery system 120. The content request is for one or more content items.

At block 250, in response to receiving the content request, multiple entity feature values are identified for a particular entity that is associated with the content request. The content request may include an entity identifier, which is used to look up the entity feature values. Two or more of the entity feature values correspond to two or more of the types of engagements. Such entity feature values may be calculated on the fly or may be pre-computed values that are retrieved from storage.

At block 260, a prediction is generated by inputting the identified entity feature values into the prediction model. One or more feature values that are input to the prediction model may be video-specific features of a candidate video item. Thus, block 260 may repeat for each candidate content item that is identified as relevant to the particular entity.

At block 270, a particular content item that includes video is selected, from among multiple candidate content items, based on the prediction(s).

In a related embodiment, process 200 involves only a single engagement type. Therefore, each training instance includes a single engagement ratio for that engagement type and each input to the trained prediction model includes a feature for that engagement type and no other engagement type.

In a related embodiment, one or more of the engagement footprint features are bucketized, indicating that one or more engagement footprint features are used for different impression count ranges. Thus, if there are eight buckets or impression count ranges and three types of engagement, then the prediction model of block 230 includes twenty-four engagement footprint features.

EXAMPLE PREDICTION SYSTEM

Figure 3:
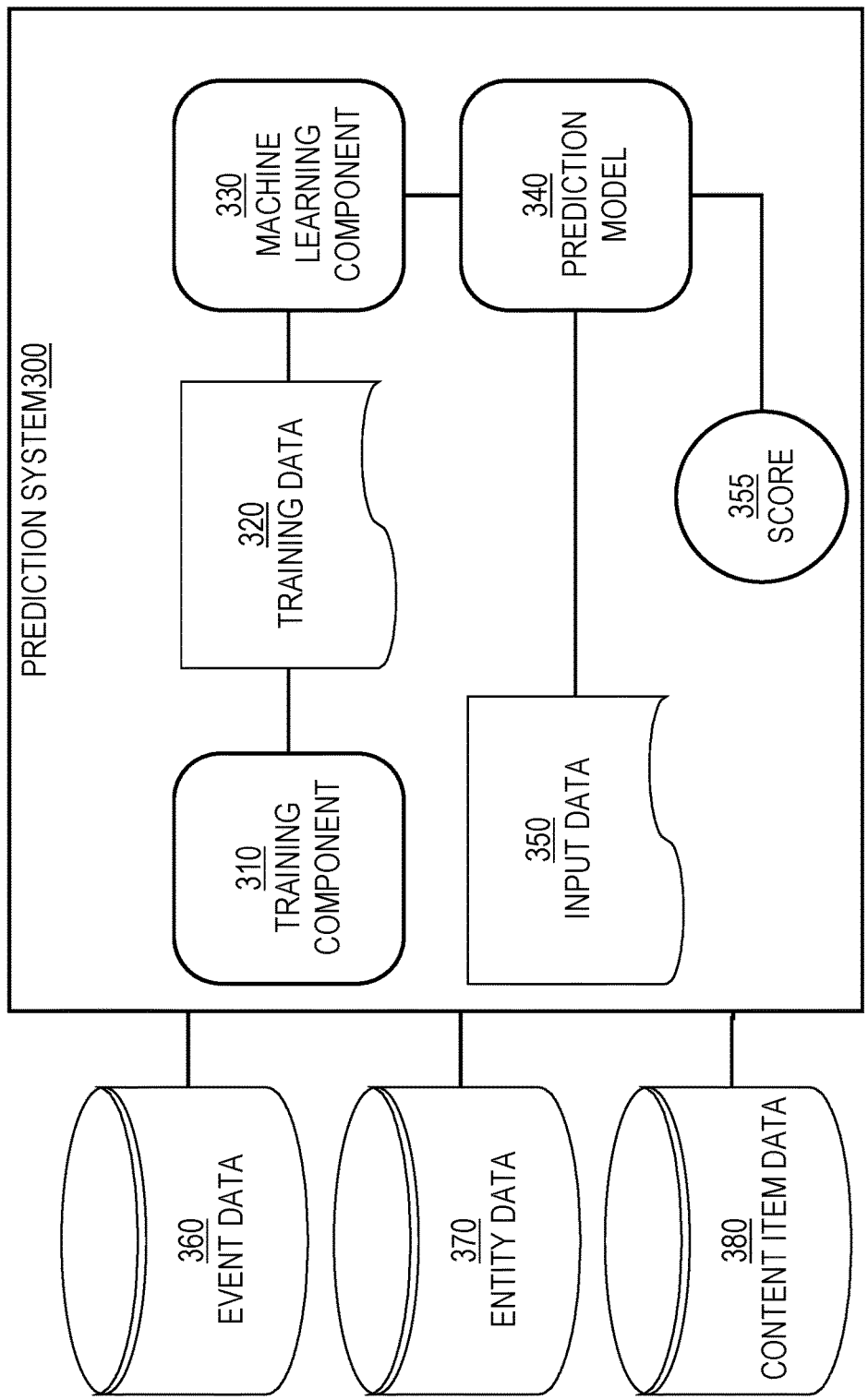
FIG. 3 is a block diagram that depicts an example prediction system, in an embodiment.

FIG. 3 is a block diagram that depicts an example prediction system 300, in an embodiment. Prediction system 300 may be part of (or affiliated with) content delivery system 120. Prediction system 300 comprises training component 310, training data 320, machine learning component 330, prediction model 340, and input data 350. Prediction system 300 has access to event data 360, entity data 370, and content item data 380.

Event data 360 comprises events generated by client devices interacting with displayed content items. Entity data 370 comprises data about multiple entities (or users). For example, entity data 370 comprises profiles, each containing information provided by the corresponding entity, such as name, job title, industry, current and past employers, work history, work summaries, skills, academic institutions attended, academic degrees earned, interest, etc. Entity data 370 may also include, for each entity, online activity data that indicates online activity performed by the entity, such as which pages or views the entity requested, the profile pages of people and/or companies that the entity requested or viewed, a number of content items that the entity selected, a number of video items presented to the entity, etc.

Training component 310 reads event data 360, entity data 370, and content item data 380 in order to generate training data 320. For example, given one or more events from event data 360, training component 310 generates a training instance that indicates whether a particular action was performed relative to a particular content item and a particular entity (such as the particular entity selecting the particular content item or the particular entity being presented with a portion of a video of the particular content item). Training component 310 also computes or retrieves entity feature values of the particular entity and content item feature values of the particular content item and includes these feature values in the training instance.

Machine learning component 330 implements one or more machine learning techniques and takes, as input, at least a portion of training data 320, to produce prediction model 340. Machine learning component 330 may also use (or a different component, not depicted, may use) a (different) portion of training data 320 to validate prediction model 340 to ensure an adequate recall and precision.

Once prediction model 340 is validated, prediction model 340 is deployed and used in content item selection events, at least for video items. Thus, in an embodiment, a different prediction model may be used for non-video content items. Prediction model 340 accepts instances of data from input data 350 to generate a score 355 that represents a prediction. The score may be a floating point number between certain values (e.g., 0 and 1 or 0 and 100) or a discrete output, such as A, B, C, or D. Whatever the type of value, score 355 indicates a likelihood of an entity indicated in input data 350 viewing at least a particular portion of (or selecting or otherwise interacting with) the video item indicated in input data 350.

Input data 350 may be received from content delivery exchange 124. Input data 350 may comprise all the feature values necessary to generate a prediction, including one or more engagement footprint feature values (or one or more engagement ratios). Alternatively, input data 350 comprises an entity identifier and a content item identifier. In this scenario, prediction system 300 uses (1) the entity identifier to retrieve entity feature values (including engagement footprint feature values) from, for example, entity data 370 and (2) the content item identifier to retrieve content item feature values from, for example, content item data 380.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
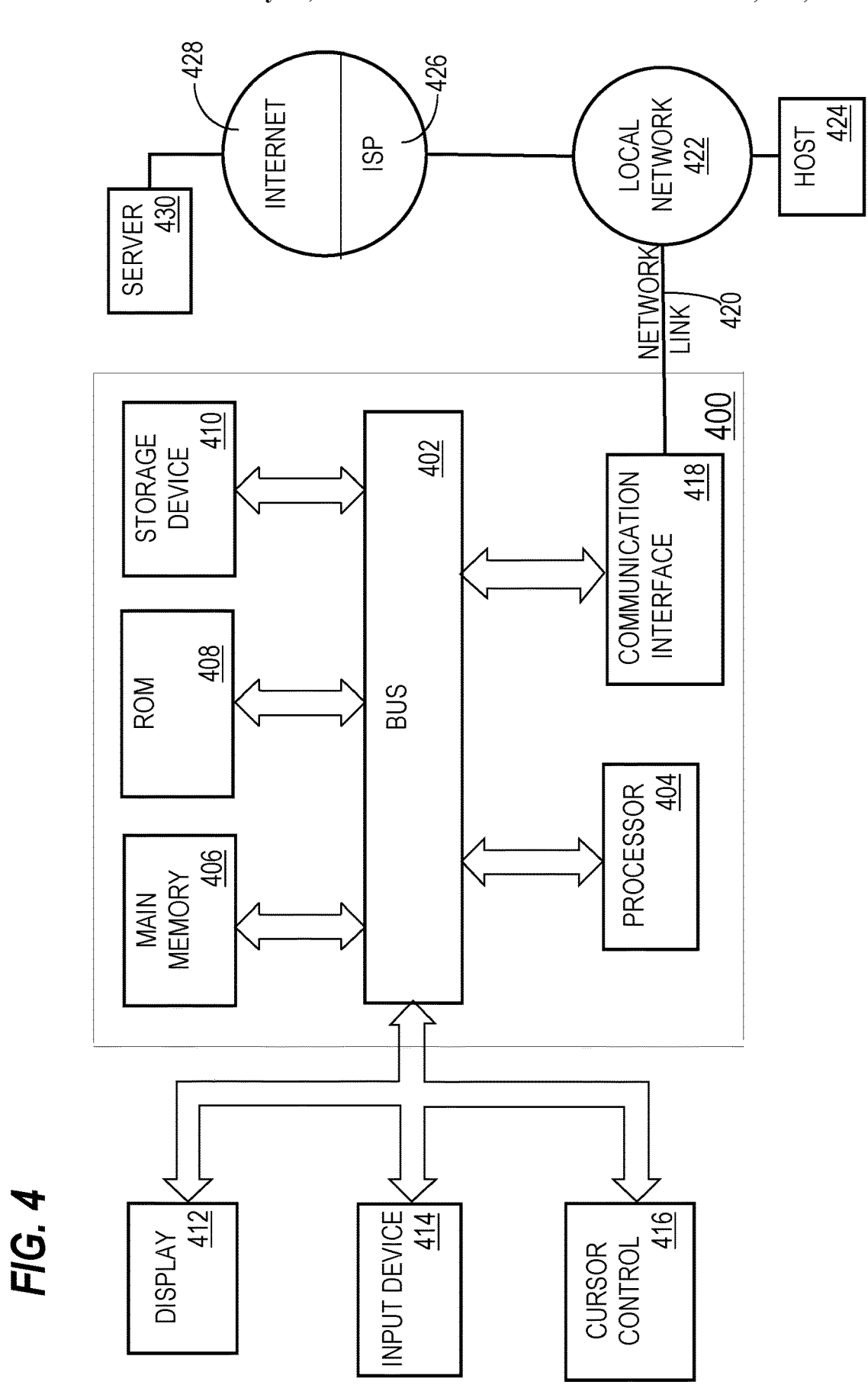
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
receiving, from a plurality of client devices, a plurality of events, each event indicating a type of engagement of a video item from among a plurality of types of engagement, wherein a first event indicates a first type of engagement of the plurality of types of engagement and a second event indicates a second type of engagement of the plurality of types of engagement;
using one or more machine learning techniques to train a prediction model that is based on the plurality of events and a plurality of features that includes the plurality of types of engagement;
the plurality of features includes a first set of features for entities associated with a first impression count range and a second set of features for entities associated with a second impression count range;
determining a number of impressions of one or more video items by a particular entity associated with a content request;
in response to determining that the number of impressions is within the first impression count range, generating feature values for the set of features associated with the first impression count range;
in response to determining that the number of impressions is within the second impression count range, generating feature values for the set of features associated with the second impression count range;
based on an impression count range, identifying a plurality of entity feature values for the particular entity, wherein two or more entity feature values in the plurality of entity feature values correspond to two or more of the plurality of types of engagement;
generating a prediction based on the plurality of entity feature values and the prediction model; and
using the prediction to determine whether to select, from a plurality of content items, a particular content item that includes particular video.

2. The method of claim 1, wherein the plurality of types of engagements include two or more of viewing a certain amount of a video, viewing a first quartile of a video, viewing half of a video, viewing a third quartile of a video, viewing an entirety of a video, or selecting a particular video control.

3. The method of claim 2, wherein the particular video control corresponds to muting, unmuting, pausing, resuming, full screening, expanding, collapsing, or replaying.

4. The method of claim 1, wherein the prediction is a first prediction that is included in a set of predictions, wherein generating the first prediction is also based on feature values of the particular content item, the method further comprising:
in response to receiving the content request, identifying the plurality of content items;
for each content item in the plurality of content items other than the particular content item:
generating a second prediction based on the prediction model, the plurality of entity feature values and multiple feature values of said each content item;
adding the second prediction to the set of predictions;
selecting a certain content item from among the plurality of content items based on the set of predictions.

5. The method of claim 1, further comprising:
generating training data that comprises a plurality of training instances;
wherein generating the training data comprises:
identifying a first entity that is associated with a video-related event that pertains to a particular video item and that is based on data received from a first client device of the first entity;
for each type of engagement in the plurality of types of engagement:
determining an engagement ratio, of said each type of engagement, associated with the first entity;
inserting the engagement ratio into a training instance of the plurality of training instances;
including, in the training instance, a label value that indicates whether a particular action occurred relative to the particular video item.

6. The method of claim 5, wherein determining the engagement ratio comprises:
determining a number of engagements, by the first entity, of said each type of engagement over a particular period of time;
determining a number of impressions to the first entity of one or more video items over the particular period of time;
calculating the engagement ratio based on the number of engagements and the number of impressions.

7. The method of claim 5, wherein the particular action is displaying a particular portion of the particular video item or the first entity selecting a particular video control.

8. The method of claim 1, wherein the plurality of entity feature values includes the feature values for the first set of features.

9. A method comprising:
receiving, from a plurality of client devices, a plurality of events that includes a first event and a second event, wherein the first event indicates a first entity and that an impression of a video item occurred and the second event indicates the first entity and that a particular action occurred relative to the video item;
based on the plurality of events, generating training data that comprises a plurality of training instances, wherein generating the training data comprises:
identifying the first entity that is associated with the first event that pertains to the video item;
determining an engagement ratio, of a particular type of engagement of a plurality of different types of engagement;
the particular type of engagement is different than the particular action, associated with the first entity;
inserting the engagement ratio into a training instance of the plurality of training instances;
based on the second event, including, in the training instance, a label value that indicates that the particular action occurred relative to the video item;
using one or more machine learning techniques to train a prediction model that is based on the training data and a plurality of features that includes the particular type of engagement;
the plurality of features includes a first set of features for entities associated with a first impression count range and a second set of features for entities associated with a second impression count range;

determining a number of impressions of one or more video items by a particular entity associated with a content request;

determining that the number of impressions corresponds to an impression count range;

based on the impression count range, identifying a plurality of entity feature values for the particular entity, wherein two or more entity feature values in the plurality of entity feature values correspond to two or more of the plurality of types of engagement;

for each content item in a plurality of content items, using the prediction model to generate a prediction based on the plurality of entity feature values, wherein the prediction is added to a set of predictions; and based on the set of predictions, selecting, from among the plurality of content items, a particular content item that includes video.

10. The method of claim 9, wherein determining the engagement ratio comprises:

determining a number of engagements, by the first entity, of said each type of engagement over a particular period of time;

determining a number of impressions to the first entity of one or more video items over the particular period of time;

calculating the engagement ratio based on the number of engagements and the number of impressions.

11. The method of claim 9, wherein the particular types of engagement includes one of: viewing a certain amount of a video, viewing a first quartile of a video, viewing half of a video, viewing a third quartile of a video, viewing an entirety of a video, or selecting a particular video control.

12. The method of claim 9, further comprising:

in response to determining that the number of impressions is within the first impression count range, generating feature values for the first set of features; and in response to determining that the number of impressions is within the second impression count range, generating feature values for the second set of features;

wherein the plurality of entity feature values includes the feature values for the first set of features.

13. One or more non-transitory storage media storing instructions which, when executed by one or more processors, cause:

receiving, from a plurality of client devices, a plurality of events, each event indicating a type of engagement of a video item from among a plurality of types of engagement, wherein a first event indicates a first type engagement of the plurality of types of engagement and a second event indicates a second type of engagement of the plurality of types of engagement;

using one or more machine learning techniques to train a prediction model that is based on the plurality of events and a plurality of features that includes the plurality of types of engagement;

the plurality of features includes a first set of features for entities associated with a first impression count range and a second set of features for entities associated with a second impression count range;

determining a number of impressions of one or more video items by a particular entity associated with a content request;

in response to determining that the number of impressions is within the first impression count range, generating feature values for the first set of features;

in response to determining that the number of impressions is within the second impression count range, generating feature values for the second set of features;

determining that the number of impressions corresponds to an impression count range;

based on the impression count range, identifying a plurality of entity feature values for the particular entity, wherein two or more entity feature values in the plurality of entity feature values correspond to two or more of the plurality of types of engagement;

generating a prediction based on the plurality of entity feature values and the prediction model; and using the prediction to determine whether to select, from a plurality of content items, a particular content item that includes particular video.

14. The one or more non-transitory storage media of claim 13, wherein the plurality of types of engagements include two or more of viewing a certain amount of a video, viewing a first quartile of a video, viewing half of a video, viewing a third quartile of a video, viewing an entirety of a video, or selecting a particular video control.

15. The one or more non-transitory storage media of claim 14, wherein the particular video control corresponds to muting, unmuting, pausing, resuming, full screening, expanding, collapsing, or replaying.

16. The one or more non-transitory storage media of claim 13, wherein the prediction is a first prediction that is included in a set of predictions, wherein generating the first prediction is also based on feature values of the particular content item, wherein the instructions, when executed by the one or more processors, further cause:

in response to receiving the content request, identifying the plurality of content items;

for each content item in the plurality of content items other than the particular content item:

generating a second prediction based on the prediction model, the plurality of entity feature values and multiple feature values of said each content item;

adding the second prediction to the set of predictions;

selecting a certain content item from among the plurality of content items based on the set of predictions.

17. The one or more non-transitory storage media of claim 13, wherein the instructions, when executed by the one or more processors, further cause:

generating training data that comprises a plurality of training instances;

wherein generating the training data comprises:

identifying a first entity that is associated with a video-related event that pertains to a particular video item and that is based on data received from a first client device of the first entity;

for each type of engagement in the plurality of types of engagement:

determining an engagement ratio, of said each type of engagement, associated with the first entity;

inserting the engagement ratio into a training instance of the plurality of training instances;

including, in the training instance, a label value that indicates whether a particular action occurred relative to the particular video item.

18. The one or more non-transitory storage media of claim 17, wherein determining the engagement ratio comprises:

determining a number of engagements, by the first entity, of said each type of engagement over a particular period of time;

determining a number of impressions to the first entity of one or more video items over the particular period of time;

calculating the engagement ratio based on the number of engagements and the number of impressions.

19. The one or more non-transitory storage media of claim 17, wherein the particular action is displaying a particular portion of the particular video item or the first entity selecting a particular video control.

20. The one or more non-transitory storage media of claim 13, wherein the plurality of features include (1) a first set of features for entities associated with a first impression count range and (2) a second set of features for entities associated with a second impression count range; and the plurality of entity feature values includes the feature values for the first set of features.

* * * * *